G. I. KEENER.
FASTENING OR COUPLING.
APPLICATION FILED OCT. 19, 1918.
1,297,477.
Patented Mar. 18, 1919.
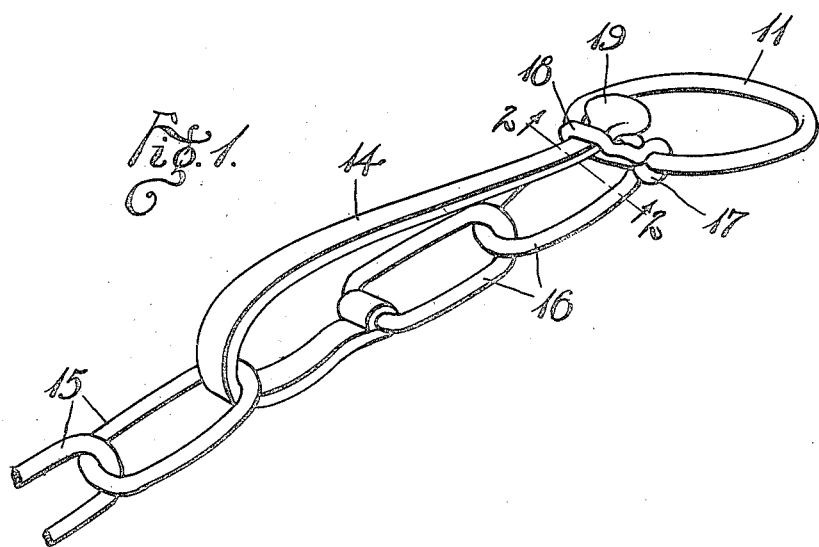
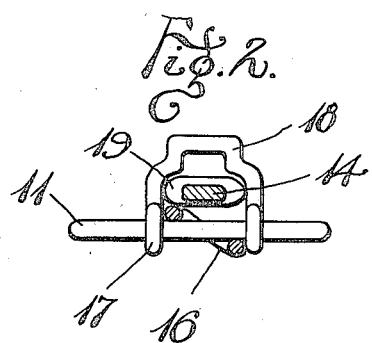
George I. Keener, Inventor
by Monroe E. Miller,
Attorney.

UNITED STATES PATENT OFFICE.

GEORGE I. KEENER, OF WESTON, WEST VIRGINIA.

FASTENING OR COUPLING.

1,297,477.   Specification of Letters Patent.   Patented Mar. 18, 1919.

Application filed October 19, 1918. Serial No. 258,882.

*To all whom it may concern:*

Be it known that I, GEORGE I. KEENER, a citizen of the United States, and resident of Weston, in the county of Lewis, and State of West Virginia, have invented certain new and useful Improvements in Fasteners or Couplings, of which the following is a specification.

The present invention relates fasteners or couplings for anti-skid chains and other devices, and this application is a division of the copending application for Patent on anti-skid chains, filed May 8th, 1918, Serial No. 233,211.

It is the object of the invention to provide a novel and improved fastener or coupling for use in anti-skid chains of vehicle tires or for use in other devices, adapted for conveniently and effectively drawing together and holding two sets of links or members, means being provided for holding the fastener or coupling in closed position against accidental loosening of the parts.

A further object is to provide such a fastener or coupling embodying a loop-shaped cam lever for drawing the links or members toward one another, and novel means for latching said lever in closed position.

With the foregoing and other objects in view, which will be apparent as the invention is better understood, the invention resides in the construction and combination of parts as hereinafter described and claimed, it being understood that changes can be made within the scope of what is claimed without departing from the spirit of the invention.

The invention is illustrated in the accompanying drawing, wherein—

Figure 1 is a perspective view of the coupling.

Fig. 2 is a cross section on the line 2—2 of Fig. 1 showing the latch or catch in releasing position.

Although the present fastener or coupling is intended especially for use on the anti-skid chains of pneumatic vehicle tires, it can be used to advantage for various purposes when such a coupling is desired. As illustrated the cam lever coupling 14, which is of hook or loop form, used for drawing together and connecting two sets of links 15 and 16, the links 16 being connected to a ring or circular link 11. These links form part of an anti-skid chain, but they can be taken to represent other members for which the present coupling is suited. The loop- or hook-shaped bill of the lever 14 is provided at one terminal with an eye or pivot portion pivotally engaging one link 16, and the other terminal of the bill projects beyond said pivot portion to be inserted through one of the links 15 according to the adjustment desired, so that the lever in being swung will draw the links 15 and 16 toward one another and the link 15 which slidably engages the lever will come to rest in the seat formed by the bend or bight of its loop, thus completing the connection of the parts. This lever, therefore, provides a convenient and effective means for drawing the links toward one another and holding them thus.

In order to hold the lever or hook 14 in closed position, and to prevent the accidental loosening or opening of the lever, a latch or catch 17 is provided, and is of loop form with eyes at its ends pivotally embracing the ring or link 11 astride the respective link 16 which engages said ring. The free or intermediate portion of the latch 17 has an offset portion 18 in which the bill of the lever or hook is seatable outwardly when the latch is swung over the free end of the lever which is provided with a rounded knob or head 19. When the lever is pressed against the ring 11 by hand, the latch 17 can be readily swung over or off of the end of the hook, the opening of the latch being large enough for the passage of the knob 19, but when the lever is seated in the offset notched portion 18 of the latch, or in the reduced portion of the latch opening, the accidental releasing of the lever is prevented due to the fact that the latch cannot swing away from the lever, because the knob 19 extends to opposite sides and is too large to pass through the notch portion 18. It thus requires manual effort to uncouple the two sets of links, the lever being first pressed against the ring 11 and the latch or catch 17 then being swung away from the lever over its knob 19, which is not now prevented because the knob 19 has been moved out of the way of the portion 18 so that said portion can swing past the knob. After the latch is thus released, the lever or hook can be swung open to let the link 15 slip therefrom.

Having thus described the invention, what is claimed as new is:—

1. A coupling embodying a lever having a pivot portion, a loop and a knob at its free terminal, a ring, a link connection between said ring and pivot portion, and a latch of loop form having eyes at its ends pivotally embracing said ring adjacent to said link connection to maintain the latch and link connection in relative position, said latch being swingable over said knob.

2. A coupling embodying a lever having a pivot portion, a loop and a knob at its free terminal, a ring, a link connection between said ring and pivot portion, and a latch of loop form having eyes at its ends pivotally embracing said ring adjacent to said link connection to maintain the latch and link connection in relative position, said latch being swingable over said knob, and having an opening for the passage of said knob when moved toward said ring and having a reduced portion in which the lever is seatable away from said ring and through which the knob cannot move.

In testimony whereof I hereunto set my hand this 17th day of October, 1918.

GEORGE I. KEENER.